(12) United States Patent
Srivastava

(10) Patent No.: US 10,425,123 B2
(45) Date of Patent: Sep. 24, 2019

(54) PARTS-PER-MILLION DETECTION APPARATUS AND METHOD

(71) Applicant: Intel Corporation, Santa Clara, CA (US)

(72) Inventor: Amit Kumar Srivastava, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/845,355

(22) Filed: Dec. 18, 2017

(65) Prior Publication Data
US 2019/0028139 A1   Jan. 24, 2019

Related U.S. Application Data

(60) Provisional application No. 62/534,150, filed on Jul. 18, 2017.

(51) Int. Cl.
| | | |
|---|---|---|
| *H04L 7/00* | (2006.01) | |
| *H04B 1/7097* | (2011.01) | |
| *H04B 1/7073* | (2011.01) | |
| *H04L 7/04* | (2006.01) | |

(52) U.S. Cl.
CPC ......... *H04B 1/7097* (2013.01); *H04B 1/7073* (2013.01); *H04L 7/0029* (2013.01); *H04L 7/0087* (2013.01); *H04L 7/048* (2013.01); *H04B 2201/7073* (2013.01)

(58) Field of Classification Search
CPC ............... H04B 1/7097; H04B 1/7073; H04B 2201/7073; H04L 7/048; H04L 7/0029; H04L 7/0087
See application file for complete search history.

(56) References Cited

U.S. PATENT DOCUMENTS

| | | | |
|---|---|---|---|
| 7,409,031 B1 * | 8/2008 | Lee | H03L 7/07 375/371 |
| 8,666,013 B1 | 3/2014 | Khor et al. | |
| 8,687,738 B1 | 4/2014 | Lee et al. | |
| 9,036,764 B1 * | 5/2015 | Hossain | H03L 7/087 375/355 |
| 9,106,370 B1 | 8/2015 | Srinivasa et al. | |
| 9,379,878 B1 * | 6/2016 | Lugthart | H04L 7/033 |
| 2005/0135523 A1 * | 6/2005 | Carballo | H03L 7/0802 375/354 |
| 2009/0296866 A1 * | 12/2009 | Hsieh | H04J 3/0685 375/371 |
| 2010/0150290 A1 | 6/2010 | Kim et al. | |
| 2011/0064176 A1 | 3/2011 | Takada | |
| 2011/0068836 A1 * | 3/2011 | Wang | H03L 7/0807 327/141 |
| 2014/0307769 A1 * | 10/2014 | He | H04L 7/0062 375/233 |

OTHER PUBLICATIONS

International Search Report & Written Opinion dated Sep. 28, 2018 for PCT Patent Application No. PCT/US2018/037385.

* cited by examiner

*Primary Examiner* — Dac V Ha
(74) *Attorney, Agent, or Firm* — Green, Howard & Mughal LLP

(57) ABSTRACT

An apparatus is provided which comprises: a first circuitry to track a spread spectrum of a differential signal according to sampled data; and a second circuitry to adjust phase of a clock according to the spread spectrum, wherein the clock is used for sampling the differential signal.

20 Claims, 8 Drawing Sheets

US 10,425,123 B2

PARTS-PER-MILLION DETECTION APPARATUS AND METHOD

CLAIM OF PRIORITY

This application claims priority of U.S. Provisional Application Ser. No. 62/534,150 filed Jul. 18, 2017, and is included by reference in its entirety.

BACKGROUND

Spread Spectrum Clocking (SSC) technique is widely used for high speed communication which helps in reducing electromagnetic interference (EMI).

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Spread Spectrum Clocking (SSC) is used in a source asynchronous system having a host and a device coupled together via a link, where a transmitter of the host forwards SSC modulated data to a receiver of the device. The SSC data is a data in which the frequency of the data is varied. When SSC is applied to an asynchronous system, data is modulated at the host (e.g., the device having the transmitter that transmits this modulated data) but clock is not sent with it. The receiver of the device then recovers clock and data.

Figure 1A:
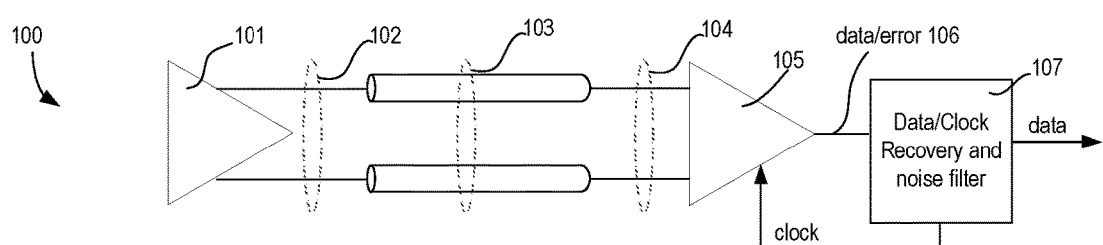
FIG. 1A illustrates a system with a receiver to receiver data and clock.

FIG. 1A illustrates host and client system 100 in which the host 101 comprises a transmitter that sends modulated differential data 102 over a differential transmission media 103 to a client having receiver 105. The receiver 105 samples the received data 104 and generates data and error (data/error) 106 for logic 107. Logic 107 is a data and clock recovery and noise filter which generates the data for further processing. Logic 107 generates that data by recovery a clock used for sampling the received data 104.

Figure 1B:
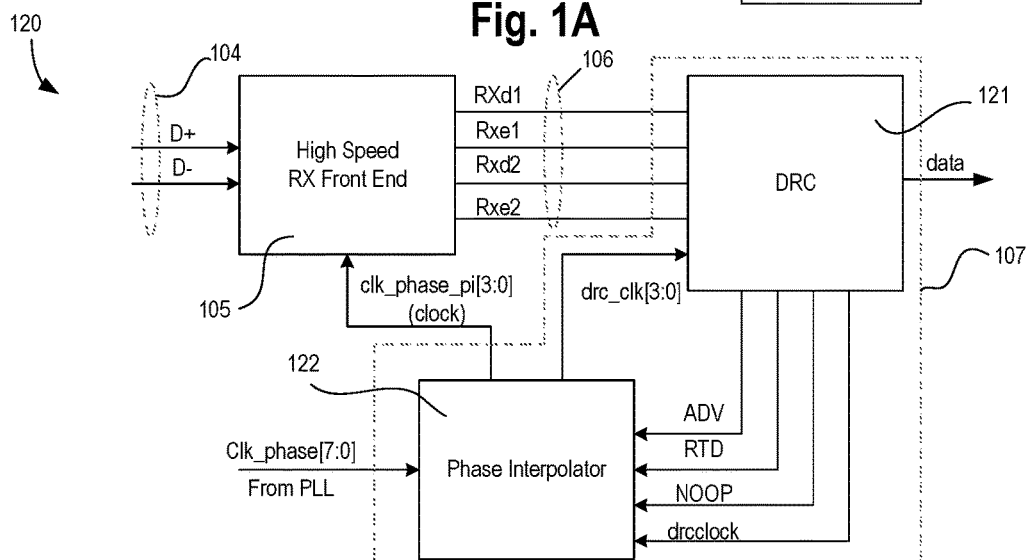
FIG. 1B illustrates a receiver of a half rate phase interpolator (PI) based clock data recovery circuit.

FIG. 1B illustrates a receiver 120 with a half rate phase interpolator (PI) based clock data recovery (CDR) circuit for the receiver. The receiver of FIG. 1B shows a high speed receiver (RX) frontend (e.g., amplifier) which may be part of receiver 105, Data Recovery Circuit (DRC) 121, and phase interpolator (PI) 122. DRC 121 and PI 122 may be part of the logic 107. In some embodiments, DRC 121 comprises a digital filter (e.g., voter based, priority based, etc. to determine whether phase of a clock needs to change or not). In this example, the PI 122 receives an 8-bit clock phase from a phase locked loop (PLL) (e.g., 8 phases from the PLL) and generates a 4 bit phase interpolated clock clk_phase_pi[3:0] (e.g., four clock phases) for RX frontend 105 to sample incoming differential data 104 (also expressed as D+ and D−), and a four bit (or phase) DRC clock drc_clk[3:0] for DRC 121. The drc_clk[3:0] are the clock phases prior to adjustment of the clock, while clk_phase_pi[3:0] are clock phases after adjustment of the clock. The PI 122 may include a delay line, multiplexers, or any another circuit digital or analog, voltage mode or current mode, to generate phase interpolated output. The RX frontend 105 may include an amplifier with sampling latch (or sampling latch can be outside of the amplifier), termination impedances, coupling capacitors, etc.

The four phases of the phase interpolated clock are used to sample differential data D+ and D− resulting in two pairs of data and error signals—Rxd1,Rxe1 and Rxd2,Rxe1. The output of DRC are lead (ADV), lag (RTD), or no operation (NOOP) indication to PI to shift the clock through PI. DRC circuit also sends the synchronize clock (drcclock). One of the phase of the synchronize clock which is used to generate ADV, RTD and NOOP indications.

Here, the SSC modulated data is received by the receiver 105 (e.g., Universal Serial Bus (USB3) complaint receiver) which is to tolerate SSC from +500 ppm to −5000 ppm with 30-33 KHz modulation rate. Since the modulate rate is very low or slow, it is challenging to filter out the phase interpolated clock using a low pass or a band pass filter. As such, the receiver architecture of FIG. 1B results in SSC jitter that is not tracked. Untracked jitter which is not compensated for, or not accounted for, may cause timing issues.

To track the SSC jitter, the PI based clock data recovery (CDR) circuit needs higher order filter circuits. However, the use of a second order filter may not be sufficient as second order filters have large steady state error. Likewise, using a third order filter for tracking frequency error may not capture frequency overshoot for SSC during a switching point.

Various embodiments solve the above issues and challenges by providing a frequency error tracking circuit and a circuit technique to detect the PPM or spread spectrum switching point and to track PPM changes by generating a correction pulse. In some embodiments, the correction pulse is used by a phase interpolator to compensate for the frequency induced accumulated phases in the input differential data. In some embodiments, the PPM detection circuit is equivalent to a second order or third order PI based CDR having PPM switching point detection capability to improve CDR-PI performance tracking capability. Some embodiments describe a PPM detector and PPM slope detector circuit technique which is used by a PI-CDR circuit to track and compensate for wide SSC spectrum.

There are many technical effects of various embodiments. For example, the circuit of various embodiments is better than the receiver architecture of FIG. 1B because it provides a digital circuit solution which can is configurable and synthesizable depending on an update rate and a sampling window. The circuit of various embodiments is a more robust solution which provides SSC tracking scheme for PI-CDR. The PPM slope detector of various embodiment is used to find the maximum and minimum PPM, which helps in finding the abrupt phase changes due to the direction changes in the PPM. Here, a positive direction generally refers to an increase in PPM while negative direction generally refers to a decrease in PPM. While various embodiments are illustrated with reference to tracking SSC jitter, the embodiments are not limited to such. For example, the architecture of various embodiments can be used for filtering any tracking profile (e.g., power supply noise, and other signal noise). In some embodiments, the source of error is irrelevant to the tracking and filtering techniques of the various embodiments. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level. The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

For the purposes of present disclosure, the terms "spin" and "magnetic moment" are used equivalently. More rigorously, the direction of the spin is opposite to that of the magnetic moment, and the charge of the particle is negative (such as in the case of electron).

It is pointed out that those elements of the figures having the same reference numbers (or names) as the elements of any other figure can operate or function in any manner similar to that described, but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Figure 2:
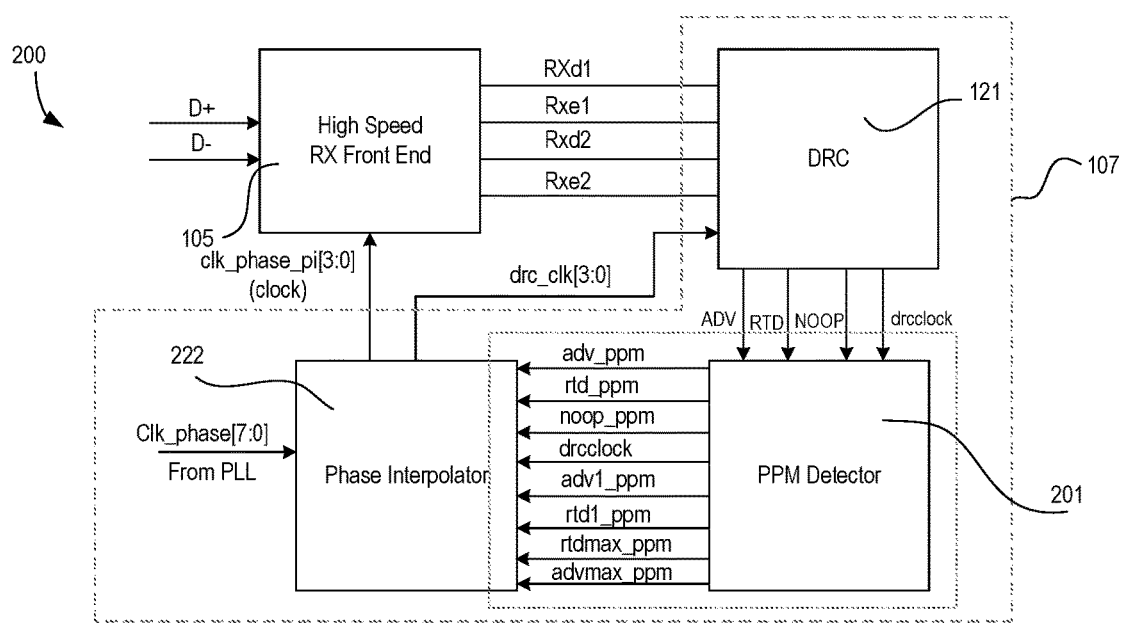
FIG. 2 illustrates a receiver with a parts-per-million (PPM) detector circuit for a PI based clock data recovery (CDR) circuit architecture, according to some embodiments of the disclosure.

FIG. 2 illustrates a receiver 200 with parts per million (PPM) detector circuit for PI based clock data recovery (CDR) circuit architecture, according to some embodiments of the disclosure. In some embodiments, receiver 200 comprises RX frontend 105, DRC 121, PPM detector 201, and PI 222. In some embodiments, PPM detector circuit 201 is responsible for detecting ppm based on regions. These regions indicate the movement or direction of PPM. For example, PPM detector circuit 201 may detect 10 states to cover 5500 ppm and each state with 550 ppm changes. In some embodiments, PPM detector circuit 201 detects granularity within 550 ppm, so a total number of 10 states are used to cover for 5500 ppm. In some embodiments, the PPM detector circuit 201 generates compensation pulses (e.g., adv1_ppm and rtd1_ppm pulses) to correct the PI phase steps to track the SSC. Advance PPM pulse (e.g., adv1_ppm) may indicate that the PPM difference is reducing (e.g., negative direction) and so the clock phase for sampling the differential data 106 needs to be shifted in the forward direction (e.g., advance). Retract or backward PMM pulse (e.g., rtd1_ppm) may indicate that the PPM difference is increasing (e.g., positive direction) and so the clock phase needs to be shifted in the backward direction (e.g., retract). In some embodiments, PPM detector circuit 201 detects a frequency tolerance of the differential signal, and to check a slope or derivative of frequency change in the frequency of the differential signal. In some embodiments, PPM detector circuit 201 generates one or more correction signals to mitigate frequency variation in the differential signal, and wherein the fourth circuitry is to adjust a phase of the clock to mitigate the frequency variation in the differential signal.

In some embodiments, adv1_ppm and rtd1_ppm pulses are used for compensating phase correction due to PPM difference that is detected by the PPM Detection circuit. In some embodiments, adv1_ppm and rtd1_ppm pulses can be used to compensate with more number of or pulses or less fewer number of pulses but with wider pulse width times. In some embodiments, various ADV and RTD pulses are generated by DRC 121 based on data and clock phase differences, but adv1_ and rtd1_ indications are generated to compensate the slow clock phase variation due to the PPM differences. For example, depending on whether the clock phase needs to shift left or right, adv1_ppm and rtd1_ppm indicators are generated.

In some embodiments, PPM detector 201 detects a PPM peak using PPM slope changes. For example, PPM detector 201 uses two samples of the PPM slope within a sampling window to detect the PPM peak. If the PPM slope changes within the sampling window, then a phase correction is performed using an average of previous and future phase steps. For instance, during clock phase change, PPM may reach a maximum or a minimum, and generally detection circuits are unable to detect such peaks. When the PPM reaches its peak (e.g., maximum or minimum), the slope detected by the PPM detection circuit 201 changes a lot due to the sudden phase jump. In order to smooth this sudden phase jump, whenever the PPM Detection circuit 201 detects a phase difference change, a phase correction is performed based on an average of a previous and future phase step (e.g., before the PPM slope change versus after the PPM slope change), in accordance with some embodiments.

In some embodiments, the PPM detector 201 generates an additional signal like adv1_ppm, rtd1_ppm of FIG. 1B to counter the ppm driven phase accumulation for each state or region. In some embodiments, the PPM detector 201 generates rtdmax_ppm and advmax_ppm signals or pulses based on the PPM slope detection and based on finding where the maximum and minimum peak of the PPM is detected. Here, rtdmax_ppm indicates generation of the minimum peak while advmax_ppm indicates generation of the maximum peak. As discussed above, rtdmax_ppm and advmax_ppm are also used for determining the sudden slope change indication in the PPM.

In some embodiments, the use of rtdmax_ppm and advmax_ppm signals or pulses changes the PI code. For example, the clock phases are updated based on the correction pulses. Here, correction phase of the maximum or minimum PPM is used to generate an average phase, which is then used for compensating clock phase variation, in accordance with some embodiments.

Figure 3:
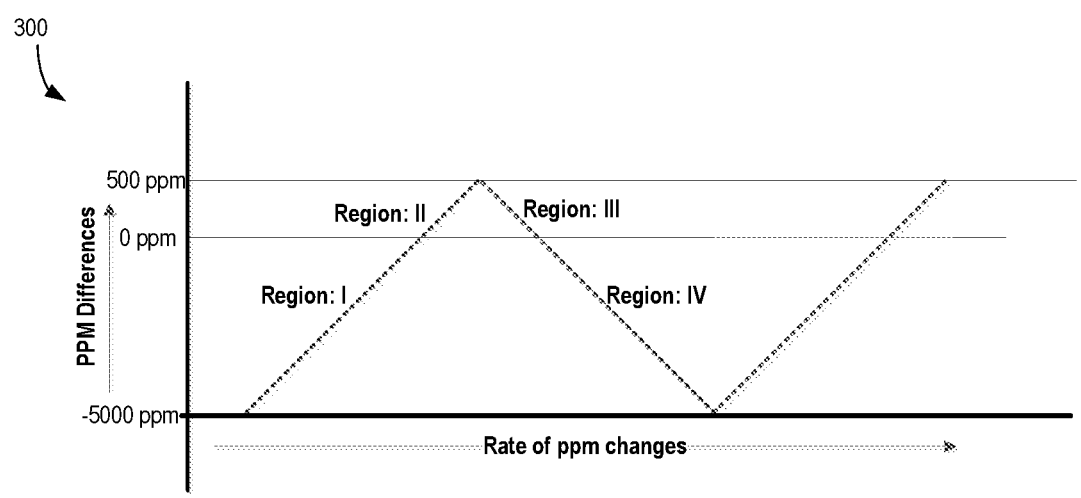
FIG. 3 illustrates a plot showing PPM rate changes and regions of operating for generating a compensation pulse, according to some embodiments of the disclosure.

FIG. 3 illustrates a plot 300 showing PPM rate changes and region of operating for generating compensation pulse, according to some embodiments of the disclosure. Here, the x-axis is the rate of PPM changes while the y-axis is the PPM difference. The plot shows PPM differences versus modulation rate. The plot is divided into 4 regions. These regions are used by the PPM detector 201 to generate a compensation pulse, PPM states (multiple of 550 ppm as an example) and for finding the maximum/minimum of the PPM. However, more and fewer regions can also be used for generating the advance and retard pulses. The PPM detector uses the regions to change the direction of the compensation pulse generation and/or to find slope changes during the sampling window.

Here, Region 1 indicates a region where the PPM increases from negative to zero PPM, which causes more number of rtd_ppm pulses to be generated compared to adv_ppm. PPM increase means that the clock phase change is increasing. So correction pulse is generated to compensate the pulse to track the clock phase changes. For instance, clock phase steps are decreased in another direction. As such, to counter the effect of PPM increase, adv1_ppm compensation pulse is generated in accordance with some embodiments.

Here, Region II indicates a region where the PPM decreases from positive to negative PPM which causes more number of adv_ppm pulses to be generated compared to rtd_pulse. PPM decrease means that the clock phase is changing or decreasing in the other direction. So correction pulse is generated (e.g., compensation pulse) to track the phase changes. PPM decrease means that the clock phase is changing or decreasing in a direction opposite of that of Region I. To counter this effect of PPM decreasing, more number of rtd1_ppm pulses are generated to compensate and track the phase change and hence track SSC, in accordance with some embodiments.

Here, Region III indicates a region where the PPM decreases from positive to negative PPM which causes more number of adv_ppm pulses to be generated compared to rtd_pulse. To counter the effect of PPM decrease, more number of rtd1_ppm pulses are generated to compensate and track SSC.

Here, Region IV indicates a region where more PPM decreases from 0 PPM (e.g., PPM decreases below 0 PPM) which causes more number of adv_ppm pulses to be generated compared to rtd_ppm. In this case, PPM error reaches a minimum error. To counter the effect of PPM decrease, more number of adv1_ppm pulses are generated, in accordance with some embodiments.

The accumulated phase tolerance (or phase error) can be expressed as follows:

$$\text{Accumulated PPM tolerance} = \text{Count}(avd-rtd) * 1e06 / (\text{Update rate in UI} * \text{Phase steps per UI of PI});$$

where PI phase steps is 64 per UI (unit interval). In this example, the update rate is 1800 and is configurable by hardware and/or software. Here, the term update rate generally refers to how fast ADV or RTD pulses are generated. Each PPM region may be divided into 10 regions of 550 PPM tolerance to cover (e.g., to track) 5500 PPM difference range, and each 550 PPM tolerance from the above equation uses a total count of 64 ADV and RTD pulses, for example. In some embodiments, the total count of ADV and RTD pulses is programmable depending on what is the maximum limit to track.

Figure 4:
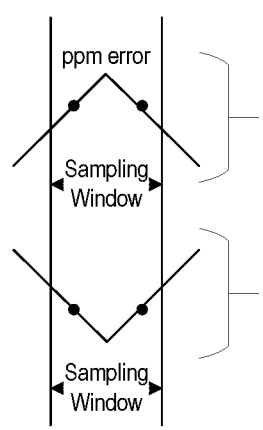
FIG. 4 illustrates a plot showing a basic principal for generating PPM slope detection, according to some embodiments of the disclosure.

FIG. 4 illustrates a plot 400 showing the basic principal for generating PPM slope detection, according to some embodiments of the disclosure. Some embodiments use a sampling window to identify the peak value of the PPM difference change and the amount of correction needed based on two samples within a sampling window. In some embodiments, if the ramp rate of the PPM difference changes (e.g., PPM frequency changes), then rtd_max is generated based on an average of two samples and subtraction from a steady state value. The ramp rate is detected based on a peak value of 50 PPM or −5000 PPM value, for example. In some embodiments, if the ramp rate of the PPM difference curve changes, then adv_max is generated based on an average of the two samples and subtraction from a steady state value.

Figure 5:
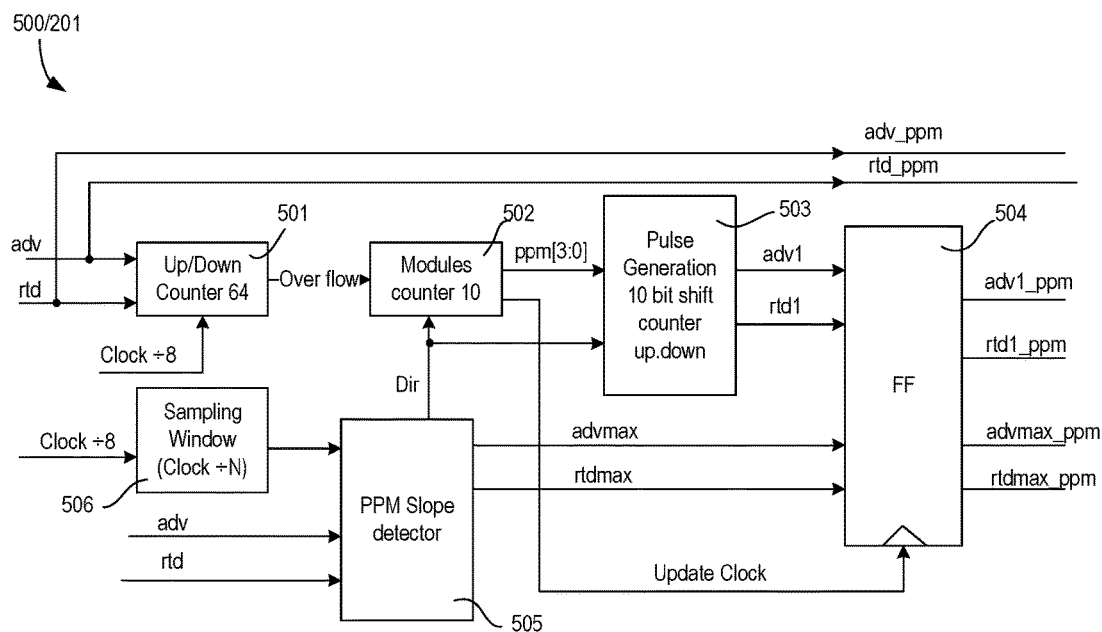
FIG. 5 illustrates a PPM detector logic, according to some embodiments of the disclosure.

FIG. 5 illustrates a PPM detector logic (or circuitry) 500 (e.g., 201), according to some embodiments of the disclosure. In some embodiments, PPM detector logic 500 (or circuitry) comprises up/down counter 501 (e.g., 6-bit counter to count up to 64), modules counter 502 (e.g., to count up to 10 regions), pulse generation logic 503 (e.g., 10 bit shift up/down counter), flip-flop (FF) 504, PPM slope detector 505, and sampling window 406 (e.g., clock divided 'N'). In some embodiments, up/down counter 501 counts up or down according to a divided clock (e.g., clock divided by 8) depending on whether the counter is asked to advance (adv) and retard (rtd). When the up/down counter 501 overflows, an Over flow bit is asserted which is provided to the Modules counter 10 502.

In some embodiments, an apparatus is provided which divides each PPM region into 10 states where each state is a multiple of 550 ppm. As such 5500 ppm is covered. In some embodiments, a modulus 10 counter 402 is used to represent the state of these 10 states as a four bit code ppm[3:0]. In some embodiments, these PPM regions (that are defined by ppm[3:0]) are used for generating the compensation pulses (adv1_ppm, rtd1_ppm) by Pulse Generation counter 403 and later used by the PI circuit 222 for changing the clock phase. For example, "Dir" which represents a difference between adv and rtd (e.g., up or down) is used to direct the modulus 10 counter 502 and pulse generator counter 503. In some embodiments, "Dir" is programmable. In some embodiments, adv_ppm and rtd_ppm are generated by buffering adv and rtd, respectively. In some embodiments, to count the accumulated phases for 550 PPM, a 6-bit binary counter (adv/rtd or up/down counter) is used. In some embodiments, modulus 10 counter 502 also generates clock (update clock which is same as drc_clock) which is used for updating the states and compensation pulses adv1 and rtd1.

Figure 6:
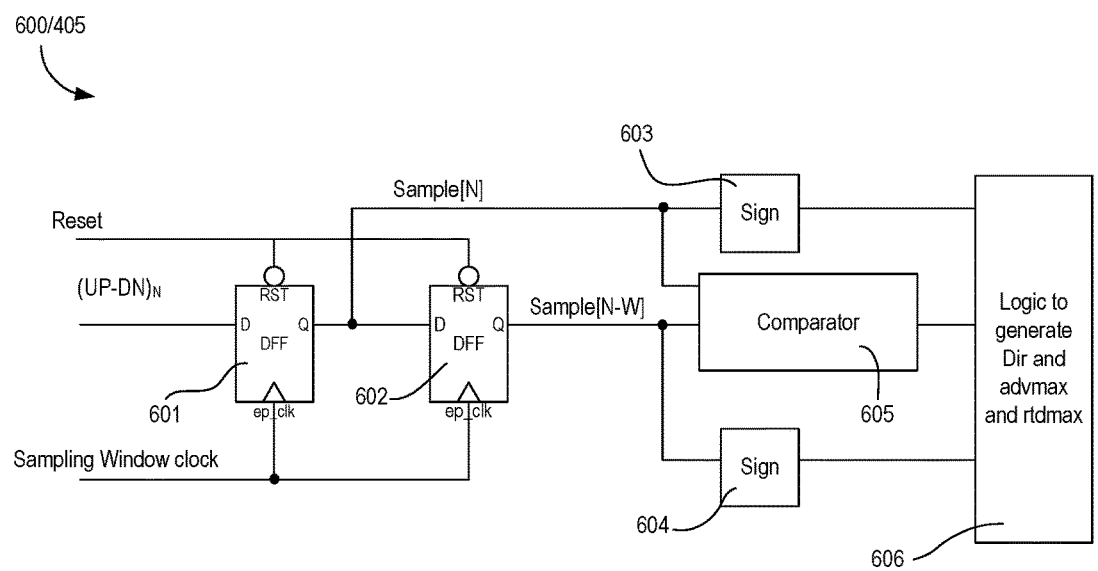
FIG. 6 illustrates a PPM slope detector circuit, according to some embodiments of the disclosure.

FIG. 6 illustrates a PPM slope detector circuit 600 (e.g., 505) of FIG. 5, according to some embodiments of the disclosure. In some embodiments, the PPM slope detector 600 comprises data flip-flops 601 and 602, comparator 605 (e.g., XOR gate), and logic 606 to generate PPM direction. Here, blocks 603/604 (referred to as sign) performs differentiation of phase changes (e.g., to detect whether PPM changes in the positive or negative direction). In some embodiments, for generating peak sampling window, two samples (Sample[N] and Sample[N-W]) from flip-flops 601 and 602, respectively, are used to compare by comparator 605 the ppm changes during a sampling window. If the previous versus new sample changes during the sampling window, PPM direction change is identified by log 606. As such, a correction compensation "Dir" is changed based on the identified PPM direction.

Figure 7:
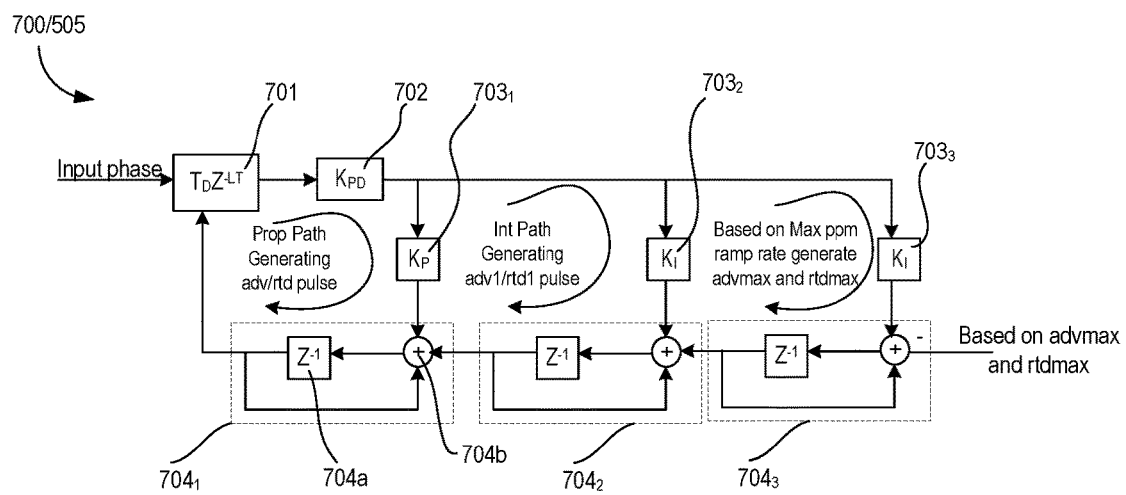
FIG. 7 illustrates an equivalent model of the PPM detector logic, according to some embodiments of the disclosure.

FIG. 7 illustrates an equivalent model 700 of the PPM detector logic 505, according to some embodiments of the disclosure. In some embodiments, equivalent model 700 comprises a third order filter. Here, three loops are shown, 701, 702, and 703. The first loop 701 corresponds to correction of a proportional phase correction and tracking. In this loop, advance (adv) or retard (rtd) pulses are generated. The second loop 702 performs the averaging. In this loop, data is integrated and advance1 (adv1) and retard1 (rtd1) pulses are generated. The third loop 703 is used for correcting a derivative or maximum/minimum ramp rate phase correction. In this loop, based on maximum PPM ramp rate, advance max (advmax) and/or retard max (rtdmax) are generated. A person skilled in the art would appreciate that the boxes 704 represent delay, boxes 705 represent summation (and/or comparison), boxes 706 represent gain factors, and box 707 represents time delay.

Figure 8:
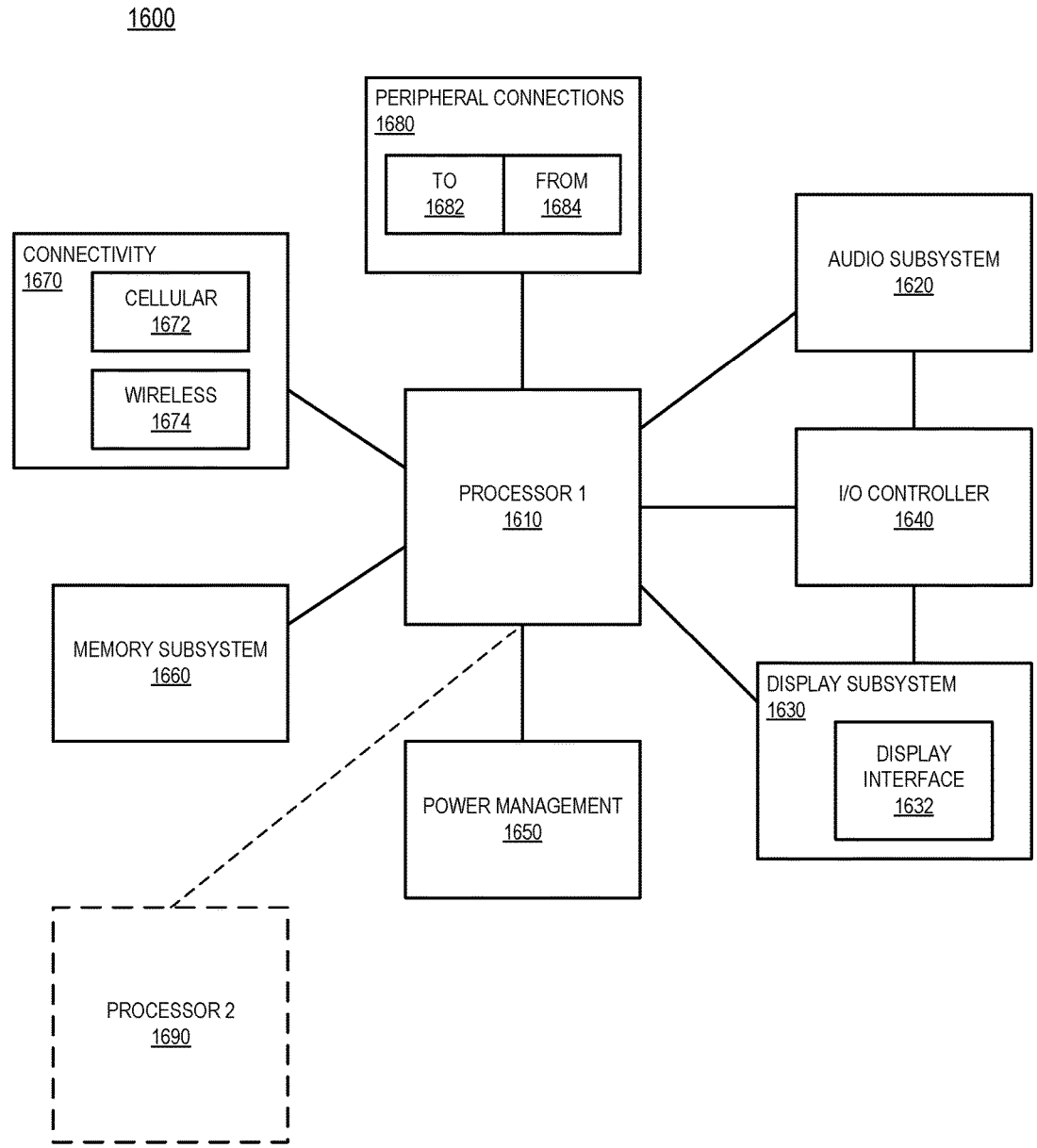
FIG. 8 illustrates a smart device or a computer system or a SoC (System-on-Chip) having apparatus for PPM detection, according to some embodiments of the disclosure.

FIG. 8 illustrates a smart device or a computer system or a SoC (System-on-Chip) having apparatus for PPM detection, according to some embodiments of the disclosure. FIG. 8 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes first processor 1610 having apparatus for PPM detection, according to some embodiments discussed. Other blocks of the computing device 1600 may also include apparatus for PPM detection, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a first circuitry to receive a differential signal, the first circuitry to generate error and data signals; a second circuitry to recover data according to the error and data signals from the first circuitry; a third circuitry to detect parts-per-million (PPM) of the differential signal according to sampled recovered data; and a fourth circuitry to adjust phase of a clock according to the PPM, wherein the clock is used for sampling the differential signal.

Example 2

The apparatus of example 1, wherein the second circuitry comprises a digital filter to determine whether the phase of the clock needs to change.

Example 3

The apparatus according to any one of examples 1 to 2, wherein the third circuitry is to detect a frequency tolerance of the differential signal, and to check a slope or derivative of frequency change in the frequency of the differential signal.

Example 4

The apparatus of example 3, wherein the third circuitry is to generate one or more correction signals to mitigate frequency variation in the differential signal, and wherein the fourth circuitry is to adjust a phase of the clock to mitigate the frequency variation in the differential signal.

Example 5

The apparatus according to any one of examples 1 to 4, wherein the fourth circuitry comprises a phase interpolator to adjust the phase of the clock, and wherein the adjusted phase of clock is used by the first circuitry to sample the differential signal.

Example 6

The apparatus according to any one of the preceding apparatus examples, wherein the first circuitry comprises an analog frontend.

Example 7

The apparatus according to any one of the preceding apparatus examples, wherein the second circuitry comprises a data recovery circuit.

Example 8

The apparatus according to any one of the preceding apparatus examples, wherein the third circuitry comprises: an up/down counter; a modulus counter coupled to the up/down counter; a pulse generation counter coupled to the modulus counter; a PPM slope generator coupled to the modulus counter; and a sampler coupled to the pulse generation counter and the PPM slope generator.

Example 9

An apparatus comprising: a first circuitry to track a spread spectrum of a differential signal according to sampled data; and a second circuitry to adjust phase of a clock according to the spread spectrum, wherein the clock is used for sampling the differential signal.

Example 10

The apparatus of example 9, wherein the first circuitry is to detect a frequency tolerance of the differential signal, and to check a slope or derivative of frequency change in the frequency of the differential signal.

Example 11

The apparatus of example 10, wherein the first circuitry is to generate one or more correction signals to mitigate the frequency variation in the differential signal, and wherein the second circuitry is to adjust a phase of the clock to mitigate the frequency variation in the differential signal.

Example 12

The apparatus according to any one of examples 9 to 11, wherein the second circuitry comprises a phase interpolator to adjust the phase of the clock, and wherein the apparatus comprises another circuitry that uses the adjusted phase of the clock to sample the differential signal.

Example 13

The apparatus according to any one of examples 9 to 12 comprises a third circuitry to receive the differential signal, wherein the third circuitry is to generate error and data signals from a sampled version of the differential signal.

Example 14

The apparatus of example 13 comprise a fourth circuitry to recover data according to the error and data signals from the third circuitry.

Example 15

A system comprising: a memory; a processor coupled to a memory via a transmission media, the processor including a receiver which comprises: a first circuitry to receive a differential signal, the first circuitry to generate error and data signals; a second circuitry to recover data according to the error and data signals from the first circuitry; a third circuitry to detect parts-per-million (PPM) of the differential signal according to sampled recovered data; and a fourth circuitry to adjust phase of a clock according to the PPM, wherein the clock is used for sampling the differential signal and the error and data signals; and a wireless interface for allow the processor to communicate with another device.

Example 16

The system of example 15, wherein the transmission media is a Universal Serial Bus (USB3) complaint transmission media, and wherein the receiver is a USB compliant receiver.

Example 17

The system of example 16 comprises a display to display the contents processed by the processor or stored in the memory.

Example 18

The system of example 16, wherein the second circuitry comprises a digital filter to determine whether the phase of the clock needs to change or not.

Example 19

The system according any of the preceding system examples, wherein the third circuitry is to detect a frequency tolerance of the differential signal, and to check a slope or derivative of frequency change in the frequency of the differential signal.

Example 20

The system of example 19, wherein the third circuitry is to generate one or more correction signals to mitigate frequency variation in the differential signal, and wherein the fourth circuitry is to adjust a phase of the clock to mitigate the frequency variation in the differential signal.

Example 21

The system of example 20, wherein the fourth circuitry comprises a phase interpolator to adjust the phase of the clock, and wherein the first circuitry is to apply the adjusted phase of the clock to sample the differential signal.

Example 22

The system of example 21, wherein the first circuitry comprises an analog frontend.

Example 23

The system of example 21, wherein the second circuitry comprises a data recovery circuit.

Example 24

The system of example 21, wherein the third circuitry comprises: an up/down counter; a modulus counter coupled to the up/down counter; a pulse generation counter coupled to the modulus counter; a PPM slope generator coupled to the modulus counter; and a sampler coupled to the pulse generation counter and the PPM slope generator.

Example 25

A method comprising: receiving a differential signal; generating error and data signals by processing the differential signal; recovering data according to the error and data signals; detecting parts-per-million (PPM) of the differential signal according to recovered data; and adjusting a phase of a clock according to the PPM, wherein the clock is used for sampling the differential signal.

Example 26

The method of example 25 comprises filtering to determine whether the phase of the clock needs to change or not.

Example 27

The method of example 25 comprises: detecting a frequency tolerance of the differential signal; and checking a slope or derivative of frequency change in the frequency of the differential signal.

Example 28

The method of example 27 comprises: generating one or more correction signals to mitigate frequency variation in the differential signal, and adjusting a phase of the clock to mitigate the frequency variation in the differential signal.

Example 29

The method according to any one of the preceding method examples comprises adjusting the phase of the clock which is used by for sample the differential signal.

Example 30

An apparatus comprising means for tracking a noise profile in a signal using a first order filter that behaves as a higher order filter, wherein the means comprises: means for receiving a differential signal, the first circuitry to generate error and data signals; means for recovering data according to the error and data signals; means for detecting parts-per-million (PPM) of the differential signal according to recovered data; and means for adjusting a phase of a clock according to the PPM, wherein the clock is used for sampling the differential signal.

Example 31

The apparatus of example 30 comprises means for filtering to determine whether the phase of the clock needs to change or not.

Example 32

The apparatus of example 30 comprises: means for detecting a frequency tolerance of the differential signal; and means for checking a slope or derivative of frequency change in the frequency of the differential signal.

Example 33

The apparatus of example 32 comprises: means for generating one or more correction signals to mitigate frequency variation in the differential signal, and means for adjusting a phase of the clock to mitigate the frequency variation in the differential signal.

Example 34

The apparatus according to any one of preceding apparatus examples 30 to 33 comprises means for adjusting the phase of the clock which is used by for sample the differential signal.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a first circuitry to receive a differential signal, the first circuitry to generate error and data signals;
   a second circuitry to recover data according to the error and data signals from the first circuitry;
   a third circuitry to detect parts-per-million (PPM) of the differential signal in accordance with sampled recovered data, wherein the third circuitry comprises: an up or down counter; a modulus counter coupled to the up or down counter; a pulse generation counter coupled to the modulus counter; a PPM slope generator coupled to the modulus counter; and a sampler coupled to the pulse generation counter and the PPM slope generator; and
   a fourth circuitry to adjust phase of a clock according to the PPM, wherein the clock is used to sample the differential signal.

2. The apparatus of claim 1, wherein the second circuitry comprises a digital filter to determine whether the phase of the clock needs to change.

3. The apparatus of claim 1, wherein the third circuitry is to detect a frequency tolerance of the differential signal, and to check a slope or derivative of frequency change in the frequency of the differential signal.

4. The apparatus of claim 3, wherein the third circuitry is to generate one or more correction signals to mitigate frequency variation in the differential signal, and wherein the fourth circuitry is to adjust a phase of the clock to mitigate the frequency variation in the differential signal.

5. The apparatus of claim 1, wherein the fourth circuitry comprises a phase interpolator to adjust the phase of the clock, and wherein the adjusted phase of clock is used by the first circuitry to sample the differential signal.

6. The apparatus of claim 1, wherein the first circuitry comprises an analog frontend.

7. The apparatus of claim 1, wherein the second circuitry comprises a data recovery circuit.

8. An apparatus comprising:
   a first circuitry to track a spread spectrum of a differential signal in accordance with sampled data;
   a second circuitry to adjust phase of a clock in accordance with the spread spectrum, wherein the clock is used to sample the differential signal;
   a third circuitry to receive the differential signal, wherein the third circuitry is to generate error and data signals from a sampled version of the differential signal; and
   a fourth circuitry to recover data in accordance with the error and data signals from the third circuitry.

9. The apparatus of claim 8, wherein the first circuitry is to detect a frequency tolerance of the differential signal, and to check a slope or derivative of frequency change in the frequency of the differential signal.

10. The apparatus of claim 9, wherein the first circuitry is to generate one or more correction signals to mitigate the frequency variation in the differential signal, and wherein the second circuitry is to adjust a phase of the clock to mitigate the frequency variation in the differential signal.

11. The apparatus of claim 9, wherein the second circuitry comprises a phase interpolator to adjust the phase of the clock, and wherein the apparatus comprises another circuitry that uses the adjusted phase of the clock to sample the differential signal.

12. A system comprising:
    a memory;
    a processor coupled to a memory via a transmission media, the processor including a receiver which comprises:
      a first circuitry to receive a differential signal, the first circuitry to generate error and data signals;
      a second circuitry to recover data in accordance with the error and data signals from the first circuitry;
      a third circuitry to detect parts-per-million (PPM) of the differential signal in accordance with sampled recovered data, wherein the third circuitry comprises: an up or down counter; a modulus counter coupled to the up or down counter; a pulse generation counter coupled to the modulus counter; a PPM slope generator coupled to the modulus counter; and a sampler coupled to the pulse generation counter and the PPM slope generator; and
      a fourth circuitry to adjust phase of a clock according to the PPM, wherein the clock is used to sample the differential signal and the error and data signals; and
    a wireless interface to allow the processor to communicate with another device.

13. The system of claim 12, wherein the transmission media comprises a Universal Serial Bus (USB3) complaint transmission media, and wherein the receiver is a USB compliant receiver.

14. The system of claim 13 comprises a display to display the contents processed by the processor or stored in the memory.

15. The system of claim 13, wherein the second circuitry comprises a digital filter to determine whether the phase of the clock needs to change or not.

16. The system of claim 13, wherein the third circuitry is to detect a frequency tolerance of the differential signal, and to check a slope or derivative of frequency change in the frequency of the differential signal.

17. The system of claim 16, wherein the third circuitry is to generate one or more correction signals to mitigate frequency variation in the differential signal, and wherein the fourth circuitry is to adjust a phase of the clock to mitigate the frequency variation in the differential signal.

18. The system of claim 13, wherein the fourth circuitry comprises a phase interpolator to adjust the phase of the clock, and wherein the first circuitry is to apply the adjusted phase of the clock to sample the differential signal.

19. The system of claim 18, wherein the first circuitry comprises an analog frontend.

20. The system of claim 18, wherein the second circuitry comprises a data recovery circuit.

* * * * *